(12) United States Patent
Chou et al.

(10) Patent No.: US 7,938,544 B2
(45) Date of Patent: May 10, 2011

(54) PROJECTOR AND HEAT DISSIPATING DEVICE THEREOF

(75) Inventors: Chih-Cheng Chou, Miao Li County (TW); Sen-Ming Hsu, Taipei Hsien (TW); Wen-Hsien Su, Miao Li County (TW)

(73) Assignee: Coretronic Corporation, Chu-Nan, Miao Li County (TW)

( * ) Notice: Subject to any disclaimer, the term of this patent is extended or adjusted under 35 U.S.C. 154(b) by 681 days.

(21) Appl. No.: 11/706,200

(22) Filed: Feb. 15, 2007

(65) Prior Publication Data
US 2007/0247593 A1     Oct. 25, 2007

(30) Foreign Application Priority Data

Apr. 21, 2006   (TW) ............................ 95114420 A

(51) Int. Cl.
*G03B 21/16*   (2006.01)
*G03B 21/18*   (2006.01)
*B60Q 1/06*   (2006.01)
*F21V 29/00*   (2006.01)

(52) U.S. Cl. ......................................... 353/61; 362/373
(58) Field of Classification Search ................ 353/61, 353/57, 58, 60, 199; 362/373, 294, 264; 348/748; 352/202
See application file for complete search history.

(56) References Cited

U.S. PATENT DOCUMENTS

| | | | | |
|---|---|---|---|---|
| 6,808,273 B2* | 10/2004 | Morinaga | ...................... | 353/119 |
| 7,210,825 B2* | 5/2007 | Watanabe et al. | ............. | 362/373 |
| 7,380,965 B2* | 6/2008 | Nakashita | ...................... | 362/373 |
| 7,441,903 B2* | 10/2008 | Kim | ................................ | 353/61 |
| 7,481,540 B2* | 1/2009 | Morimoto et al. | .............. | 353/57 |
| 2002/0197158 A1 | 12/2002 | Hsu et al. | | |
| 2003/0179579 A1* | 9/2003 | Hsu et al. | ....................... | 362/294 |
| 2004/0076009 A1* | 4/2004 | Liao | .............................. | 362/294 |
| 2004/0141155 A1 | 7/2004 | Wang et al. | | |
| 2006/0146293 A1* | 7/2006 | Morimoto et al. | .............. | 353/61 |

FOREIGN PATENT DOCUMENTS

| | | |
|---|---|---|
| TW | 514350 | 6/1990 |
| TW | 573748 | 8/1991 |
| TW | 577552 | 2/2004 |
| TW | 224237 B | 11/2004 |

* cited by examiner

Primary Examiner — Que T Le
Assistant Examiner — Ryan Howard
(74) Attorney, Agent, or Firm — Birch, Stewart, Kolasch & Birch, LLP

(57) ABSTRACT

A projector includes a housing, an optical engine module, a light source, a system fan and a lamp cooling fan. The housing includes a air vent and an intake. The optical engine module is disposed in the housing. The light source is disposed on one end of the optical engine module for providing light. The light source includes a first side and a opposite second side opposite to the first side. The system fan is disposed adjacent to the first side for generating an airflow flowing from the first side toward the light source. The lamp cooling fan is disposed adjacent to the second side for generating an airflow flowing from the second side toward inside of the light source and the first side. The airflow generated by the lamp cooling fan mixes with the airflow generated by the system fan and then is exhausted through the air vent.

9 Claims, 3 Drawing Sheets ial fan 10 flows from the first side 804 toward another side of the light source 8 (a second side 802). The second side 802 is adjacent to the front end 202 of the projector 2. The hot airflow flows out of the projector 2 through the air vent 16. An airflow generated by the blower 12 flows from the first side 804 into the light source 8 and then carries the heat out from the light source 8. Thereon, the airflow generated by the blower 12 flows toward the second side 802 and flows out of the projector 2 with the heat through the air vent 16. However, the distance between the inside of the light source 8 and the air vent 16 is very short. In other words, the distance that the hot airflow flows from the inside of the light source 8 to the air vent 16 is very short. As a result, the hot airflow easily flows out through the air vent 16 directly, so the vent 16 is heated by the hot airflow directly. Local temperature of the air vent 16 is very high and beyond the safety regulation. Therefore, when a fence of the air vent 16 is manufactured, the fence has to be especially made of expensive heat resistant material. Thus, the cost of the projector 2 is increased.

FIG. 2 illustrates temperature distribution diagram of the conventional vent 16. As shown in FIG. 2, several points of the air vent 16 are selected to measure the temperature. The temperature of partial regions are higher than 90° C., and the difference among regions is enormous. High temperature concentrates in specific regions. The highest temperature is 91° C. and very close to 95° C. of the highest temperature of the safety regulation. Therefore, it is a very urgent issue to unify the temperature of the air vent 16.

Besides, the projector 2 further includes a color wheel 18 disposed on an optical path of the light source 8. When the blower 12 is disposed on the first side 804, the color wheel 18 is disposed on the second side 802 for avoiding interfere with the blower 12. The color wheel 18 is far away from the axial fan 10. As a result, the color wheel 18 is not cooled properly, and a hot area is formed around the color wheel 18. The color wheel 18 is damaged due to the high heat. Furthermore, the airflow generated by the blower 12 flows through an air outlet of the light source 8 on the second side 802. The air outlet of the light source 8 is very close to the air vent 16. Therefore, light leaks easily.

PROJECTOR AND HEAT DISSIPATING DEVICE THEREOF

BACKGROUND OF THE INVENTION (1) Field of the Invention

The present invention generally relates to a projector, and particularly to a heat dissipating device of a projector.

(2) Description of the Prior Art

Please referring to FIG. 1. A conventional projector 2 includes a housing 14, an optical engine module 6 and a light source 8. A front end 202 is on one end of the housing 14 where a projection lens of the optical engine module 6 extends to. A back end 204 is opposite to the front end 202. The light source 8 is disposed on one end of the optical engine module 6 for providing the optical engine module 6 with light. When providing light, the light source 8 also generates plenty of heat. Therefore, a heat dissipating device 4 is needed for dissipating heat accumulated inside the projector 2.

A conventional heat dissipating device 4 includes an axial fan 10, a blower 12 and a air vent 16. The axial fan 10 is disposed near one side (a first side 804) of the light source 8. The first side 804 is adjacent to the back end 204 of the projector 2. The blower 12 is disposed near a front edge of the light source 8 on the first side 804, that is, near a light emitting opening of the light source 8. The axial fan 10 and the blower 8 are both disposed near the same side, the front side 804, of the light source 8. The air vent 16 is disposed on the front end 202 of the housing 14 of the projector 2. The air vent 16 is disposed corresponding to a hot airflow generated by the heat dissipating device 4.

An airflow generated by the ax

SUMMARY OF THE INVENTION

An objective of the present invention is to provide a projector for unifying temperature of an air vent of the projector. As a result, local high temperature is avoided, and the heat dissipating effect of a color wheel is improved.

The invention relates to a projector including a housing, an optical engine module, a light source, a system fan and a lamp cooling fan. The housing includes an air vent. The optical engine module is disposed in the housing. The light source is disposed on one end of the optical engine module for providing light for the optical engine module. The system fan is disposed near the light source and adjacent to a first side of the light source, for generating an airflow flowing from the first side toward the light source. The lamp cooling fan is disposed near the light source and adjacent to a second side opposite to the first side. The lamp cooling fan and the system fan are disposed adjacent to different sides of the light source respectively. The lamp cooling fan is used for generating an airflow flowing from the second side into inside of the light source. Then, the airflow flows toward the first side of the light source. After the airflow generated by the system fan mixes with the airflow generated by the lamp cooling fan, the airflows are exhausted through the air vent.

In the projector of the invention, the system fan and the lamp cooling fan are disposed adjacent to different sides of the light source respectively. As a result, heat is dissipated effectively. Also, the problem that temperature of the air vent and the color wheel is too high is avoided. Therefore, the quality of the projector is improved.

Other objectives, features and advantages of the present invention will be further understood from the further technology features disclosed by the present invention wherein there are shown and described preferred embodiments of this invention, simply by way of illustration of modes best suited to carry out the invention.

DESCRIPTION OF THE PREFERRED EMBODIMENTS

First Embodiment

Figure 1:
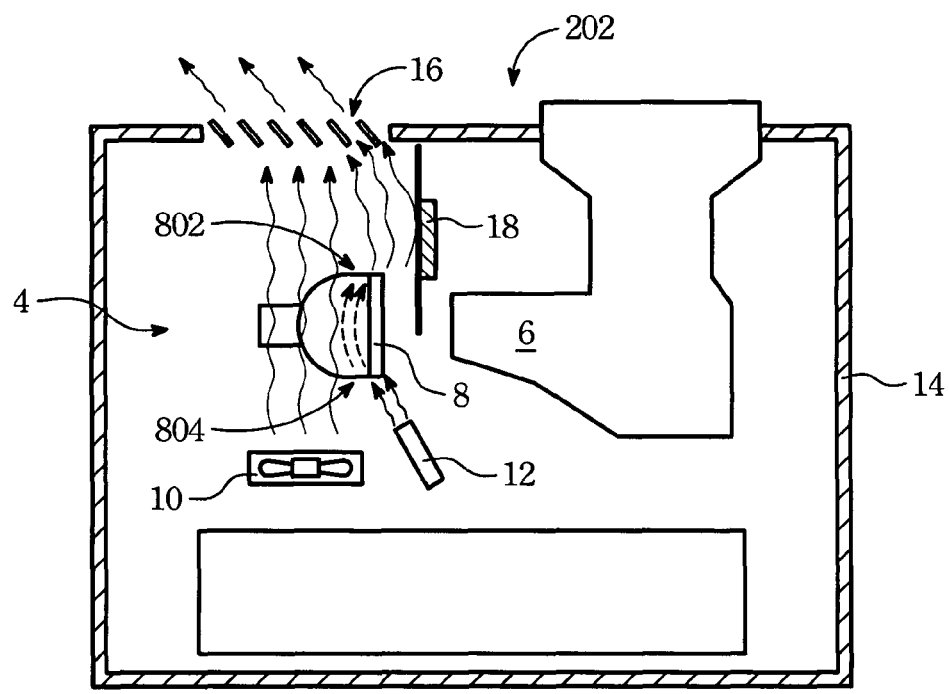
FIG. 1 is a schematic view of a conventional projector.
Figure 2:
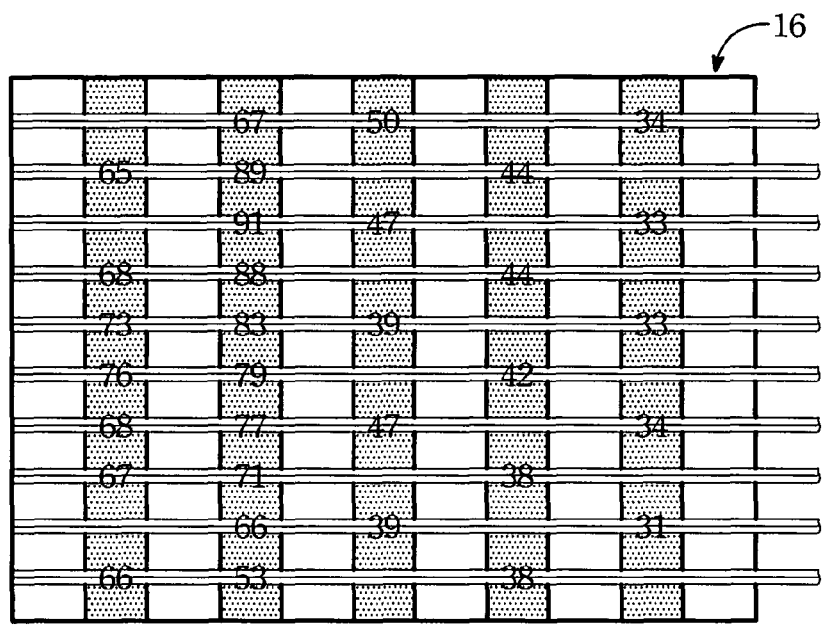
FIG. 2 is a temperature distribution diagram of a conventional air vent structure.
Figure 3:
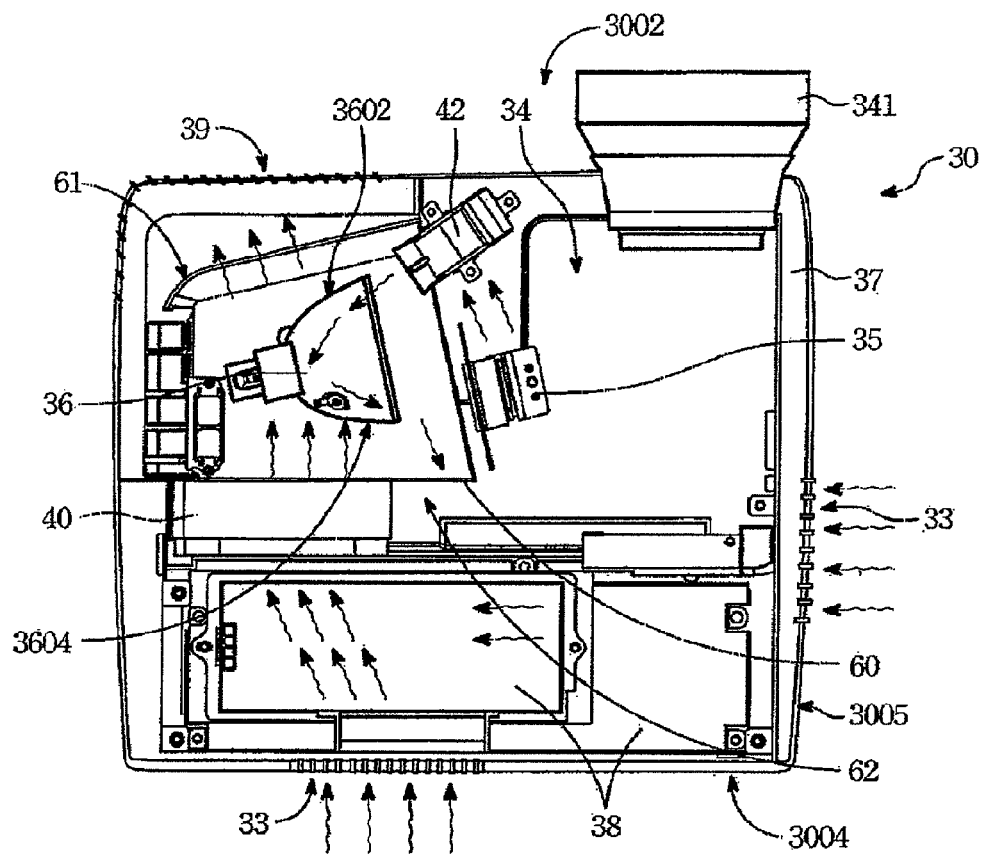
FIG. 3 is a schematic view of a projector according to a first embodiment of the present invention.

Please referring to FIG. 3. A projector 30 includes a housing 37, an optical engine module 34, a light source 36, a power module 38 and a heat dissipating device. The optical engine module 34 is disposed in the housing 37. A front end 3002 is one end of the housing 37 where a projection lens 341 of the optical engine module 34 is disposed. A back end 3004 of the housing 37 is opposite to the front end 3002. The light source 36 is disposed on one end of the optical engine module 34 for providing light for the optical engine module 34. The light source 36 includes a first side 3604 and a second side 3602 opposite to the first side 3604. The first side 3604 is near the back end 3004 of the projector 30. The second side 3602 is near the front end 3002 of the projector 30. The power module 38 includes a voltage power supply and a light source driver. The power module 38 is disposed inside the housing 37 and near the back end 3004 of the projector 30. The light source 36 generates light and high heat at the same time. The heat dissipating device is used for dissipating the heat accumulated inside the projector 30.

The heat dissipating device includes a system fan 40, a lamp cooling fan 42, a air vent 39 and an air intake 33. The system fan 40 is near the light source 36 and disposed adjacent to the first side 3604 of the light source 36. In other words, the system fan 40 is disposed between the light source 36 and the power module 38. The system fan 40 is used for extracting air from the air intake 33 to generate an airflow. After cooling the power module 38 and the optical engine module 34, the airflow flows from the first side 3604 toward the light source 36 and then the airflow is exhausted through the vent 39. For example, the system fan 40 is an axial fan. The lamp cooling fan 42 is near the light source 36 and disposed adjacent to the second side 3602 of the light source 36. The lamp cooling fan 42 and the system fan 42 are disposed adjacent to different sides of the light source 36 respectively. The lamp cooling fan 42 is used for generating an airflow flowing from the second side 3602 toward inside of the light source 36. The airflow generated by the lamp cooling fan 42 carries out the heat generated by the light source 36 and then flows toward the first side 3604 of the light source 36. For example, the lamp cooling fan 42 is a blower. The air vent 39 is disposed on the front end 3002 of the housing 37 and near the second side 3602 of the light source 36. In addition, the air vent 39 is further on a path of the airflow generated by the system fan 40. The air intake 33 is formed on the back end 3004 and a side end 3005 of the housing 37, for enabling an airflow outside the projector 30 to flow into the projector 30.

The projector 30 further includes a color wheel 35 disposed on an optical path of the light and near the first side 3604 of the light source 36. The projector 30 further includes a partition structure 60 disposed in the housing 14 and separates space inside the projector 30 into two parts, a first space 61 and a second space 62. The first space 61 includes the light source 36 and the air vent 39. The second space 62 includes the optical engine module 34, the color wheel 35, the system fan 40, the lamp cooling fan 42 and the power module 38. A plurality of apertures is formed on the partition structure 60 for enabling an airflow to flow from the second space 62 toward the first space 61 through the system fan 40 and the lamp cooling fan 42. After cooling the light source 36, the airflow flows out of the projector 30 through the air vent 39. As a result, hot air generated by the light source 36 is avoided from flowing back to the second space 62. Therefore, components of the power module 38 are avoided from high temperature.

Figure 5:
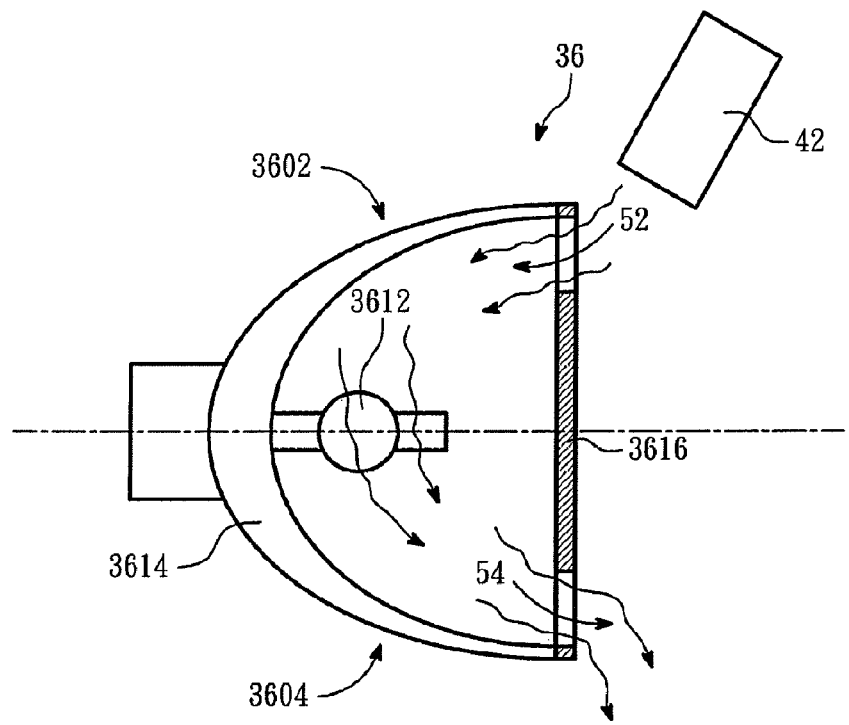
FIG. 5 is a heat dissipation diagram of a light source device according to the present invention.

Please referring to FIG. 5. The light source 36 includes a lamp wick 3612, a lamp cover 3614 and a front cover 3616. The front cover 3616 combines with an opening of a front end of the lamp cover 3614 and covers the lamp wick 3612. As a result, the lamp wick 3612 is disposed inside the light source 36. An air inlet 52 is formed on the front cover 3616 near the second side 3602. An air outlet 54 is formed on the front cover 3616 near the first side 3604. The lamp cooling fan 42 is disposed near the air inlet 52 correspondingly. An airflow generated by the lamp cooling fan 42 flows into the inside of the light source 36 through the air inlet 52 and then flows toward the first side 3604 of the light source 36 through the air outlet 54.

Please refer both FIG. 3 and FIG. 5. An airflow is drawn by the lamp cooling fan 42 through the air intake 33. Then, the airflow flows into the light source 36 through the air inlet 52 on the second side 3602. Afterward, the airflow carries out heat generated by the light source 36. Thereon, the airflow flows toward the first side 3604 of the light source 36 and is exhausted out of the light source 36 through the air outlet 54. In the meantime, a cold airflow generated by the system fan 40 flows from the first side 3604 toward the light source 36. The cold airflow generated by the system fan 40 mixes with the hot airflow generated by the lamp cooling fan 42 after the airflow generated by the lamp cooling fan 42 cools the light source 36. The airflow generated by the lamp cooling fan 42 is exhausted from the air outlet 54 with heat. The hot airflow exhausted from the air outlet 54 of the light source 36 is far from the air vent 39, the hot airflow exhausted from the air outlet 54 and the cool airflow generated by the system fan 40 mix in a spacious space. Therefore, thermal balance of the airflow is achieved, so that temperature of the whole airflow is lowered and more uniform. Then, the airflow is exhausted out of the projector 30 through the air vent 39. Compared to the prior art that the airflow flows to the air vent without completely mixture which results in local high temperature, temperature of the air vent of the invention is more uniform.

The system fan 40 draws a cold airflow through the air intake 33. The cold airflow flows toward the color wheel 35, so that the color wheel 35 is cooled effectively. The color wheel 35 is disposed in the second space and near the first side 3604 of the light source 36. The color wheel 35 is close to the system fan 40, more cold airflow flows toward the color wheel 35. As a result, the color wheel 35 is cooled by the cold airflow. Compared to the prior art, the conventional color wheel 18 is disposed near the second side 802 of the light source 8 and far from the axial fan 10. Therefore, the cold airflow in the prior art is little, so that the conventional color wheel 18 is not cooled effectively. The color wheel 35 of the invention is cooled effectively. Moreover, the air outlet 54 of the light source 36 is far from the air vent 39. Therefore, it is easier to cover the light.

Figure 4:
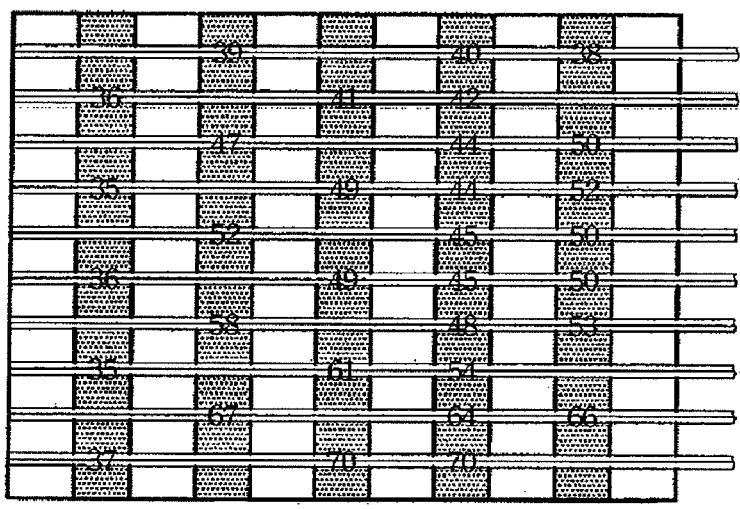
FIG. 4 is a temperature distribution diagram of a air vent structure according to the present invention.

Please refer to FIG. 4. The airflow generated by the lamp cooling fan 42 and the airflow generated by the system fan 40 mix well in the invention, temperature of the air vent distributes more uniformly in the invention than in a prior art. Also, the difference of temperature is less in the invention than in a prior. In the invention, the highest temperature is about 70° C., and most regions are below 60° C. Compared to the highest temperature of the conventional air vent 16, which is equal to 90° C., the highest temperature of the air vent 39 is 20° C. lower. The temperature of the air vent 39 of the invention is lower and more uniform. The projector 30 meets the safety regulation, and the life of the projector 30 is longer. Furthermore, when the air vent 39 is manufactured, the air vent 39 is made of general material but not expensive heat resistant material. Therefore, the cost of the projector 30 is decreased.

Second Embodiment

Figure 6:
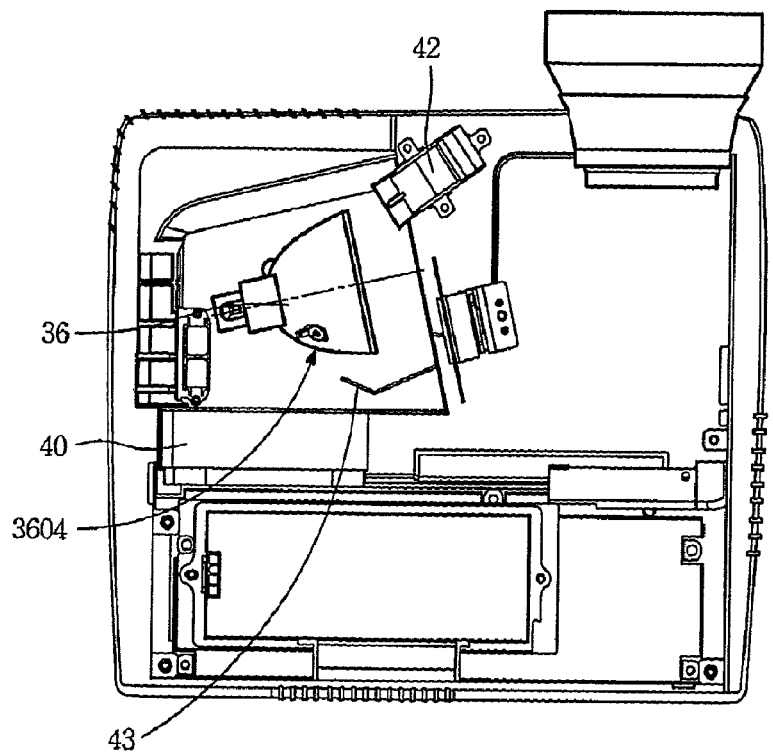
FIG. 6 is a schematic view of a projector according to a second embodiment of the present invention.

Please refer to FIG. 6. The difference between the first embodiment and the second embodiment of the invention is that the heat dissipating device further includes an air guiding plate 43. The air guiding plate 43 is disposed near the first side 3604 between the light source 36 and the system fan 40, for guiding an airflow generated by the lamp cooling fan 42 to be exhausted through the air vent 39 finally. The airflow generated by the lamp cooling fan 42 flows out through the air outlet 54 of the light source 36 and is exhausted out from the light source 36 smoothly without effect by the airflow generated by the system fan 40.

Therefore, the system fan 40 and the lamp cooling fan 42 are disposed adjacent to different sides of the light source 36 in the projector 30 of the invention. As a result, the temperature of the air vent 39 is more uniform and avoided from local high temperature. Moreover, the color wheel 35 is cooled more effectively to improve the quality of the projector 30.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector comprising:
    a housing comprising an air vent;
    an optical engine module disposed in the housing;
    a light source disposed on one end of the optical engine module for providing a light for the optical engine module, the light source having an optical axis, wherein the light source comprises:
    a lamp wick disposed inside the light source;
    a lamp cover having an opening of an front end, and
    a front cover combining with the opening of the front end of the lamp cover and covering the lamp wick,
    a system fan disposed adjacent to a first side of the light source for generating an airflow flowing from the first side toward the light source and exhausted through the air vent, wherein the system fan is disposed between the light source and a power module; and
    a lamp cooling fan disposed adjacent to a second side of the light source, the lamp cooling fan and the system fan disposed adjacent to different sides of the light source respectively, wherein the first side and the second side opposite to the first side are located at different sides of the optical axis of the light source, the lamp cooling fan used for generating an airflow flowing from the second side toward inside of the light source and the first side, the airflow generated by the lamp cooling fan mixing with the airflow generated by the system fan and then exhausted through the air vent, and wherein an air inlet is formed on the front cover near the second side of the light source, an air outlet is formed on the front cover near the first side, the lamp cooling fan is disposed near the air inlet correspondingly, and the airflow generated by the lamp cooling fan flows into the light source through the air inlet and flows toward the first side of the light source through the air outlet.

2. The projector as claimed in claim 1 further comprising a front end and a back end opposite to the front end, wherein the front end is one end of the housing where a projection lens of the optical engine module is disposed, the first side of the light source near the back end, and the second side of the light source near the front end.

3. The projector as claimed in claim 2, wherein the power module is disposed inside the housing and near the back end.

4. The projector as claimed in claim 2, wherein the air vent is disposed on the front end of the housing and near the second side of the light source.

5. The projector as claimed in claim 1 further comprising a color wheel disposed on an optical path of the light and near the first side of the light source.

6. The projector as claimed in claim 1 further comprising an air guiding plate disposed near the first side between the light source and the system fan, for guiding the airflow generated by the lamp cooling fan to be exhausted through the air vent.

7. The projector as claimed in claim 1 further comprising a partition structure to separate space inside the projector into a first space and a second space, the light source and the air vent disposed in the first space, the optical engine module, the system fan and the lamp cooling fan disposed in the second space, and a plurality of apertures formed on the partition structure for enabling an airflow to flow from the second space toward the first space through the system fan and the lamp cooling fan.

8. The projector as claimed in claim 7 further comprising a color wheel disposed in the second space and near the first side of the light source, and the color wheel positioned on an optical path of the light.

9. The projector as claimed in claim 1, wherein the system fan is an axial fan, and the lamp cooling fan is a blower.

* * * * *